United States Patent [19]

Dey

[11] 3,868,806

[45] Mar. 4, 1975

[54] BARREL NUT ASSEMBLY

[75] Inventor: Ervin J. Dey, Santa Fe Springs, Calif.

[73] Assignee: Standard Pressed Steel Co., Jenkintown, Pa.

[22] Filed: May 21, 1973

[21] Appl. No.: 362,175

[52] U.S. Cl. ............... 52/758 F, 151/69, 151/41.7, 85/8.8, 403/407
[51] Int. Cl. .............................................. F16b 5/02
[58] Field of Search .......... 52/758 F, 758 C, 758 D; 151/69, 41.7; 85/8.8; 403/407

[56] References Cited
UNITED STATES PATENTS

| | | | |
|---|---|---|---|
| 3,128,813 | 4/1964 | Davis et al. | 151/69 X |
| 3,221,589 | 12/1965 | Vander Sande et al. | 151/41.7 X |
| 3,343,581 | 9/1967 | Martin et al. | 151/69 |
| 3,503,431 | 3/1970 | Villo et al. | 85/8.8 X |
| 3,583,461 | 6/1971 | Klaus | 151/69 X |

*Primary Examiner*—Jordan Franklin
*Assistant Examiner*—Wayne L. Shedd

[57] ABSTRACT

A barrel nut assembly adapted to cooperate with a sleeve bolt, the shank of which carries a compressible retaining ring which captivates the sleeve bolt to a first workpiece is disclosed. One end of the barrel forming part of the barrel nut assembly includes a bearing surface adapted to bear against the outer surface of a second workpiece and has an inner diameter no greater than an opening formed in the second workpiece. When the sleeve bolt is inserted through the opening in the second workpiece, the inner diameter of the barrel adjacent the bearing surface maintains the retaining ring in a compressed condition.

12 Claims, 4 Drawing Figures

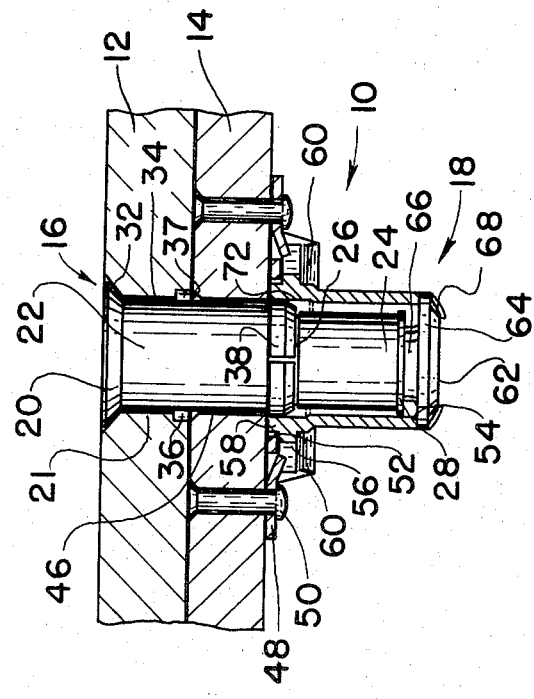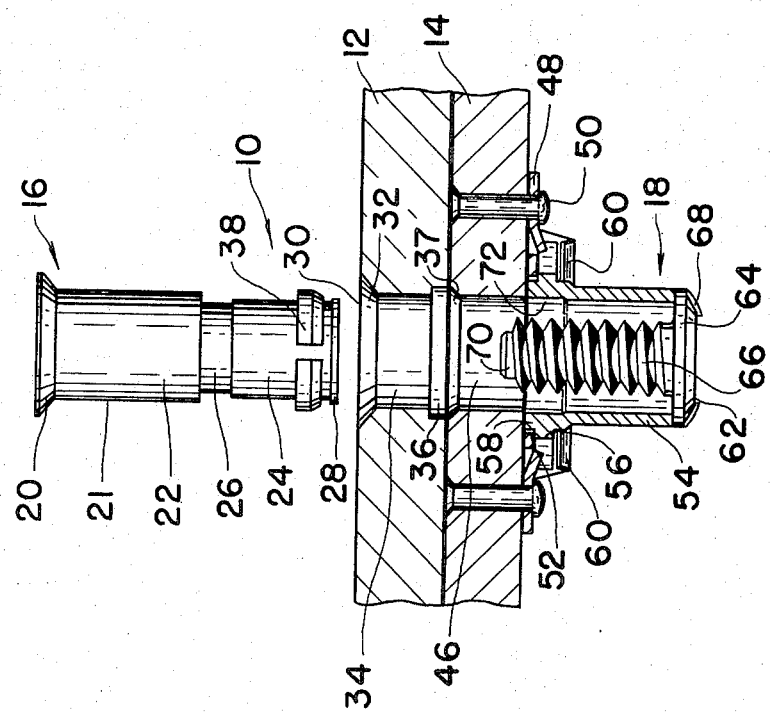

BARREL NUT ASSEMBLY

The invention disclosed in this application relates to self retained panel fastener assemblies and, more particularly, to high strength self retained panel fastener assemblies including a new and novel barrel nut assembly.

Various structural joints are formed by workpieces that are assembled and disassembled repeatedly so that the fasteners utilized to secure these joints must be capable of rapid assembly and disassembly. Because of this capability requirement, it is common to utilize self retained fastener assemblies, that is, fasteners that are carried by one of the workpieces, generally a removable workpiece, and which are prevented from being disassembled from that workpiece. Thus, when the removable workpiece is removed, the fastener is retained with the workpiece and is ready for assembly to the other workpiece at a later time. It will be appreciated that in addition to facilitating the assembly and disassembly of the removable workpiece, the use of retained fastener assemblies prevents the fastener from being lost and allows for repeated use thereof.

Modern aircraft skins include many joints of the above type in the form of access panels which are frequently removed to provide access to various electrical, hydraulic and other equipment carried by an aircraft. Some of these access panels are removed each time the aircraft lands and, of course, are replaced prior to the aircraft's taking off. Accordingly, numerous self retained panel fastener assemblies are used on modern aircraft.

Special requirements are imposed on the self-retained fastener assemblies used in aircraft because these fasteners carry part of the load imposed on the skin of the aircraft, particularly in shear. Accordingly, one of the special requirements imposed, is that the fastener have a high strength.

One type of self-retained fastener assembly that satisfies the above requirements utilizes a sleeve bolt, the shank of which captivates the sleeve bolt to its workpiece, and which cooperates with a barrel nut assembly carried by another workpiece to assemble a joint. When the joint is assembled, the retaining ring is compressed and is inserted into the other workpiece.

While the above described type of self-retained panel fastener assembly functions in a generally satisfactory manner, it should be realized that the retaining ring should not extend beyond the outer surface of the other workpiece and expand from its compressed condition. If the retaining ring expands beyond the other workpiece, disassembly of the joint would be impossible without destroying the joint. Accordingly, it is an object of this invention to provide a barrel nut assembly usable with a sleeve bolt of the type described that prevents the retaining ring from expanding beyond the outer surface of the joint.

It is a further object of this invention to provide a barrel nut assembly that is simple and economical to make and use.

It is yet another object of this invention to provide a joint secured by a self-retained panel fastener assembly including a sleeve bolt and barrel nut assembly that is reliable, has a high strength and is economical.

These and other objects of this invention are accomplished by providing a barrel nut assembly adapted to cooperate with sleeve bolt, the shank of which carries a compressible retaining ring which captivates the sleeve bolt to a first workpiece. The barrel nut assembly is adapted to be secured to a second workpiece and includes a barrel having a bearing surface formed on one end to bear against the outer surface of the second workpiece. Adjacent the bearing surface, the barrel has a diameter no greater than that of the opening in the second workpiece whereby the retaining ring on the sleeve bolt is maintained in its compressed condition if it extends beyond the outer surface of the second workpiece.

Of course, the barrel includes a suitable threaded member extending therein to cooperate with the threaded portion of the sleeve bolt. Further, the barrel is carried by a retaining plate in any suitable manner and the retaining plate is conventionally secured to the second workpiece.

For a better understanding of the present invention, together with other and further objects thereof, reference is made to the following description, taken in connection with the accompanying drawings, and its scope will be pointed out in the appended claims.

Referring to the drawings:

FIG. 1 is a view partly in section of a joint including a barrel nut assembly according to this invention prior to assembly of the joint;

FIG. 2 is a view similar to FIG. 1, but showing the joint in assembled condition.

Figure 4:
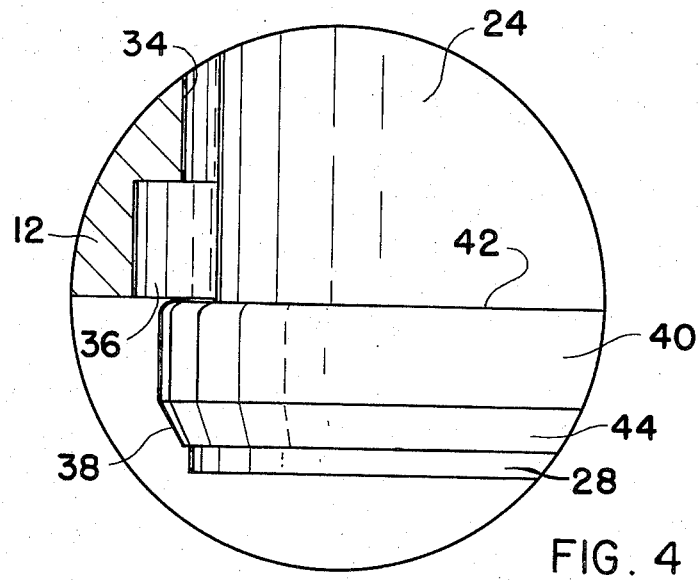
FIG. 4 is an enlarged view of a portion of a retaining ring which can be used in accordance with this invention.
Figure 3:
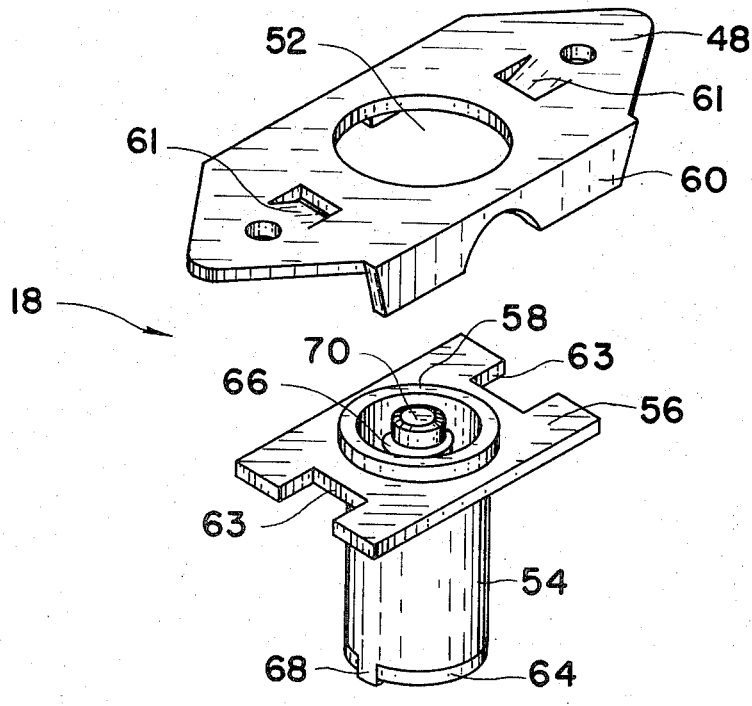
FIG. 3 is an exploded perspective view of the barrel nut assembly in accordance with this invention.

FIGS. 1 and 2 of the drawing, there is illustrated a joint assembly 10 comprising first and second workpieces 12 and 14, respectively, a sleeve bolt 16 and a barrel nut assembly 18. In a typical application of this invention, workpieces 12 and 14 may be an access panel and an underframe, respectively, but it should be understood that they may be structural members of any type. Sleeve bolt 16 comprises a head 20 of the countersink type having an internal wrenching recess (not shown) and a shank 21 extending axially therefrom. While not illustrated in the drawing, it should be noted that shank 21 is internally threaded in a conventional manner, that is, a blind hole extends from the free end of the shank toward the head and its axial wall includes a thread configuration. Shank 21 comprises a first diameter portion 22, a second diameter portion 24 and an interconnecting groove portion 26. The diameter of shank portion 24 is less than that of shank portion 22 and, of course, groove 26 has a smaller diameter than shank portion 24. Formed at the free end of the shank is a tip portion 28 having a diameter greater than that of shank portion 24 but less than that of shank portion 22. An opening 30 is formed in workpiece 12 and includes a countersink 32 complimentary to that of head 20, a cylindrical portion 34 having a diameter just slightly greater than that of first shank portion 22 so that the shank portion of sleeve bolt 16 is freely slidable in the opening. If desired, the mating surface of workpiece 12 is formed with a counterbore 36 for a purpose which will be made clear hereinafter.

Carried on shank 21 of sleeve bolt 16 is a compressible retaining ring 38 having an internal diameter less than that of first shank portion 22 and just slightly greater than that of second shank portion 24. Accordingly, retaining ring 38 is slidable along second shank portion 24 and also groove portion 26 but cannot slide over shank portion 22. To keep retaining ring 38 on the shank, tip portion 28 has a diameter just slightly greater than that of shank portion 24 and the internal diameter of retaining ring 38, but less than that of shank portion 22.

Referring to FIG. 4 where retaining ring 38 is illustrated on an enlarged scale, it can be seen that the retaining ring comprises an annular portion 40 having a finite axial length and formed with a radial wall 42 at the end closest to head 20. Extending from the other end of annular portion 40 is a frusto-conic surface portion 44 which, as will be more fully explained hereinafter, functions as an aligning means for workpieces 12 and 14 during the assembling of the joint. Frusto-conic surface 44 terminates at its free end with a radial surface having a diameter substantially equal to the diameter of tip portion 28 so that the frusto-conic surface extends radially beyond the tip portion. Retaining ring 38 is preferably a split ring member so that it can be compressed from its relaxed condition wherein the outer diameter of annular portion 40 is greater than that of the diameter of cylindrical opening 34 in workpiece 12, to a smaller diameter slightly smaller than that of cylindrical opening 34 so shank 21 can be inserted through opening 30.

As previously noted, barrel assembly 18 is carried by workpiece 14 and is adapted to cooperate with sleeve bolt 16 to secure the workpieces together. Formed in workpiece 14 is a cylindrical opening 46 having a diameter equal to that of cylindrical portion 34 of opening 30 in workpiece 12 and including a counterbore, preferably in the form of a countersink 37, at the mating surface of the workpiece.

Barrel nut assembly 18 includes a retaining plate member 48 carried on the outer face of workpiece 14 by suitable rivets 50 or other retaining means. Plate member 48 is formed with a central opening 52 which is substantially larger in diameter than opening 46 in workpiece 14. A barrel member 54 is formed with a flange 56 extending radially around its outer diameter at a point spaced from the bearing surface end 58 of the barrel by a distance, preferably, at least equal to the thickness of retaining plate 48. This distance, it should be understood, could be slightly less than the thickness of retaining plate 48. The outer diameter of bearing surface 58 is less than that of opening 52 whereby bearing surface 58 seats against the outer surface of workpiece 14. While any suitable mechanism can be utilized to secure barrel member 54 to retaining plate 48, the preferred embodiment utilizes a floating arrangement including tab members 60 bent downwardly from retaining plate 48 and inwardly across flange 56 and tab members 61 struck downwardly from the face of retaining plate 48. Tab members 61 fit into recesses 63 formed on opposite ends of flange 56 and do not overlie the flange. Therefore, tab members 61 function to limit movement of barrel member 54 in one direction while the downwardly bent portion of tabs 60 limit movement of the barrel member in another direction. Carried on the free end of barrel member 54 is an externally threaded stud 62 having a head 64 and a threaded shank 66. Again, any suitable mechanism can be utilized to secure the stud to the barrel member and in the preferred embodiment illustrated herein a tab and slot arrangement 68 is utilized. In the embodiment illustrated herein, shank member 66 extends upwardly through barrel member 54 and terminates in a dog point 70 located slightly beyond the outer surface of workpiece 14 and into opening 46.

The inner diameter of barrel member 54 includes a first portion extending from the free end toward bearing surface 58 and further includes an enlarged counterbore portion 72 adjacent the bearing surface having a diameter substantially equal to, but no greater than, the diameter of opening 46 in workpiece 14. Before describing the operation of the assembly described, one other relationship should be noted, that is, the axial length of shank portion 22 on sleeve bolt 16 should be equal to the thickness of workpieces 12 and 14 and the axial length of shank portion 24 is preferably at least equal to or slightly greater than the thickness of workpiece 14. The reason for these relationships will be made clear hereinafter.

Before securing panels 12 and 14 together it should be realized that it is first preferable to assemble sleeve bolt 16 with workpiece 12. Thus, shank 21 of sleeve bolt 16 is inserted through opening 30 in workpiece 12 from the outer surface thereof. When the shank is inserted, ring 38 in its relaxed condition will slide along shank portion 24 and into groove 26 with radial surface 42 bearing against the end of shank portion 22. At this point, frusto-conic surface 44 bears against the edge formed by countersink 32 and cylindrical portion 34 of opening 30 and is compressed to a diameter that allows insertion of shank 21 through opening 30. After the end face of shank portion 22 passes beyond cylindrical portion 34 ring 38 expands to its relaxed position. Since the outer diameter of annular portion 40 is greater than that of cylindrical portion 34, removal of sleeve bolt 16 from workpiece 12 is prevented. It should be clear that head portion 20 prevents the sleeve bolt from being withdrawn through the opening in the opposite direction.

Barrel nut assembly 18 has previously been secured to the outer surface of workpiece 14 by rivets 50 in a conventional manner. To secure workpieces 12 and 14 together, workpiece 12 is placed in overlying relationship with workpiece 14 so that opening 30 is generally aligned with opening 46. Shank 21 of sleeve bolt 16 is then inserted through opening 46. As the shank is inserted, retaining ring 38 will slide along shank portion 24 and into groove portion 26 with end face 42 bearing against the end of shank portion 22. Of course, if retaining ring 38 is already so located, the sliding action will not occur. Since shank portion 24 has an axial length at least equal to the thickness of workpiece 14, and since shank 66 terminates slightly beyond the outer surface of workpiece 14, the internal thread at the free end of the sleeve bolt will engage the end of threaded shank 66 of stud 62. At this point, torque will be applied to sleeve bolt 16 so that the threads in the sleeve bolt and on the stud will cooperate in a conventional manner. As torque is applied, frusto-conic surface 44 on retaining ring 38 will engage the edge formed between opening 46 and countersink 37 and as the application of the torque continues, surface 44 will cause workpiece 14 to shift so that openings 30 and 46 are aligned. The noted length of shank portions 24 and 66 are not necessary for this invention, but it will be understood that threaded engagement of these shank portions should occur before surface 44 engages the edge between the opening and the countersink. As the application of the torque continues, retaining ring 38 will again be compressed to a diameter that allows it and shank portion 22 to pass through opening 46.

Finally, it should be noted that retaining ring 38 cannot be allowed to expand beyond the outer surface of workpiece 14. If this should occur, retaining ring 38 will bear against the outer surface and disassembly of the joint would be impossible. In accordance with this invention, the technique for preventing expansion of the ring involves enlarged counter bore 72 adjacent bearing surface 58 of barrel member 54. Since the diameter of counterbore 72 is not greater than the diameter of opening 46, retaining ring 38 is maintained in its compressed condition when it extends beyond outer surface of workpiece 14 allowing withdrawal of sleeve bolt 16 therethrough. It should be noted that sleeve bolt 16 can be dimensioned such that ring 38 is designed to be located in opening 46 when the joint is assembled, in which case, enlarged counterbore 72 will allow for less dimensional control during manufacture of the sleeve bolt, or can be dimensioned such that the ring rides into the counterbore when the joint is assembled. The latter technique is illustrated in the drawings. In either case retaining ring 38 is maintained in a compressed condition where annular portion 40 exerts a force against wall 46 or counterbore 72 because it tends to return to its relaxed position. This force exerted by annular portion 40 constitutes a prevailing torque locking characteristic that enhances the loosening resistance of sleeve bolt 16. Thus, a locking characteristic is added to the fastening system in an economical manner. At this point, it should be noted that counterbore 36 and 37 prevent the inadvertent withdrawal of sleeve bolt 16 through opening 30 when the joint is being disassembled. Because of the counterbores, upon disassembly of the joint, retaining ring 38 can expand to its relaxed condition adjacent to the mating surface of workpieces 12 and 14 and cannot be withdrawn from workpiece 14 in a compressed condition and then inadvertently through workpiece 12.

While there has been described what is at present considered to be the preferred embodiment of the invention, it will be obvious to those skilled in the art that various changes and modifications may be made therein without departing from the invention and it is therefore aimed to cover such changes and modifications that fall within the true spirit and scope of the invention.

I claim:

1. A barrel nut assembly for use with a workpiece having an opening extending from one face thereof to the other face thereof, said assembly comprising a retaining plate adapted to be secured to one of said faces of said workpiece and having an opening formed therein, said assembly further comprising a barrel nut non-rotatably carried by said retaining plate and including a generally cylindrical shell having a bearing surface on one end and extending through said opening in said retaining plate, said opening in said retaining plate being larger than the outer diameter of said generally cylindrical shell adjacent said bearing surface whereby said bearing surface is adapted to bear against said one of said faces of said workpiece, the inner diameter of said bearing surface being no greater than the diameter of said opening in said workpiece at said one of said faces against which said bearing surface is adapted to bear, the other end of said generally cylindrical shell including thread means extending toward said one end of said generally cylindrical shell and terminating intermediate the ends thereof.

2. A barrel nut assembly in accordance with claim 1 wherein said shell has a first diameter portion extending from said other end thereof and wherein said first diameter portion has a smaller diameter than that adjacent said bearing surface.

3. A barrel nut assembly in accordance with claim 1 wherein said thread means comprises stud member having a head secured to said other end of said shell and an externally threaded shank extending toward said bearing surface.

4. A barrel nut assembly comprising a retaining plate secured to a workpiece having an opening extending therethrough, said retaining plate having an opening therein and including means for non-rotatably retaining a barrel nut, said barrel nut being a generally cylindrical member having a bearing surface formed on one end, the outer diameter of said generally cylindrical member adjacent said one end being smaller than the diameter of said opening in said retaining plate such that said bearing surface can bear directly on the outer face of said workpiece, said inner diameter of said generally cylindrical member adjacent said one end being no greater than said opening in said workpiece at said outer face, and thread means in said generally cylindrical member extending axially therein from the other end of said generally cylindrical member and terminating adjacent said bearing surface.

5. A barrel nut assembly in accordance with claim 4 wherein said central opening through said generally cylindrical member has a first diameter extending from said bearing surface toward said other end and a second diameter extending from said first diameter to said other end, said first diameter being larger than said second diameter.

6. A barrel nut assembly in accordance with claim 4 wherein said means for retaining said barrel nut on said retaining plate comprises flange means projecting around the outer surface of said generally cylindrical member, said flange means being axially spaced from said bearing surface, first tab means formed on said plate and overlying opposite sides of said flange means, and second tab means formed on said retaining plate for limiting radial movement of said barrel nut.

7. A barrel nut assembly in accordance with claim 6 wherein said first tab means are bent downwardly from opposite sides of said plate and inwardly toward each other so as to overlie said flange means, and said second tab means are struck downwardly from said plate.

8. A barrel nut assembly in accordance with claim 4 wherein said thread means includes a stud having an enlarged head at said other end of generally cylindrical member, said head having notches formed therein, said generally cylindrical member having fingers extending from said other end into engagement with said notches for retaining said stud in said generally cylindrical member.

9. A joint assembly comprising a plurality of workpieces having openings extending therethrough, a sleeve bolt retained with one of said workpieces, by a compressible retaining ring and having a head and a threaded shank extending therefrom, said shank including radially projecting means adjacent the free end thereof for retaining said ring on said shank and a groove in which said retaining ring can be compressed, said groove being spaced from said head by a distance at least equal to the combined thickness of said workpieces a barrel nut assembly non-rotatably carried by another of said workpieces, said barrel nut assembly including a generally cylindrical barrel member having a bearing surface at one end for bearing against the outer surface of said another of said workpieces and thread means extending from the other end of said barrel member toward said one end thereof, the inner diameter of said barrel member adjacent said outer surface of said another workpiece being no greater than the diameter of the opening therein, in the assembled condition of said joint assembly, said retaining ring being compressed by the inner diameter of said barrel member adjacent said outer surface of said another workpiece whereby said ring cannot expand to a diameter larger than that of said opening in said another workpiece.

10. A joint assembly in accordance with claim 9 wherein said diameter of said barrel adjacent said outer surface of said another workpiece is substantially equal to the diameter of the opening therein.

11. A joint assembly comprising a plurality of workpieces having openings extending therethrough, a non-rotatable barrel nut assembly on the outer surface of one of said workpieces, said barrel nut assembly including a threaded stud generally aligned with the aperture in said one workpiece and having a free end generally adjacent said outer surface of said one workpiece, another of said workpieces carrying a self-retained threaded sleeve bolt including a head and a shank extending through the aperture in said another workpiece, said shank including a first portion having a diameter slightly smaller than the smallest diameter of said openings and a second portion having a diameter smaller than that of said first portion, a groove interconnecting said first and second portions, and a retaining ring carried on said shank said shank having ring retaining means on the free end thereof, said ring having an inner diameter smaller than that of said first portion and larger than that of said second portion whereby said ring is slidable axially along said groove and said second portion, said ring having an outer diameter larger than the diameter of said first portion and being compressible in said groove so that said outer diameter is no longer than the diameter of said first portion, said ring further having aligning means formed thereon for aligning said apertures when said joint is being assembled, the diameter of said barrel nut adjacent said outer surface of said one of said workpieces is substantially equal to the diameter of said aperture in said one of said workpieces whereby when said joint is assembled said ring is maintained in a compressed condition in said barrel nut so that said sleeve bolt can be retracted through said one of said workpieces.

12. A joint assembly in accordance with claim 11 wherein a counterbore is formed in said barrel nut adjacent said outer surface of said one of said workpieces, said counterbore having a larger diameter than the rest of said barrel nut.

* * * * *